United States Patent
Yabuta

(10) Patent No.: US 7,876,997 B2
(45) Date of Patent: Jan. 25, 2011

(54) MOBILE TELEPHONE DEVICE

(75) Inventor: Tetsutaka Yabuta, Daito (JP)

(73) Assignee: Kyocera Corporation, Kyoto (JP)

( * ) Notice: Subject to any disclaimer, the term of this patent is extended or adjusted under 35 U.S.C. 154(b) by 922 days.

(21) Appl. No.: 10/577,764

(22) PCT Filed: Oct. 21, 2004

(86) PCT No.: PCT/JP2004/015587

§ 371 (c)(1),
(2), (4) Date: Apr. 28, 2006

(87) PCT Pub. No.: WO2005/043898

PCT Pub. Date: May 12, 2005

(65) Prior Publication Data

US 2007/0127890 A1     Jun. 7, 2007

(30) Foreign Application Priority Data

Oct. 31, 2003    (JP) .............................. 2003-372550

(51) Int. Cl.
*H04N 5/76* (2006.01)
(52) U.S. Cl. ........................................................ 386/83
(58) Field of Classification Search ................... 386/46, 386/68, 83
See application file for complete search history.

(56) References Cited

U.S. PATENT DOCUMENTS

| | | | | |
|---|---|---|---|---|
| 5,450,135 A * | 9/1995 | Schick | ........................ | 348/732 |
| 5,767,896 A * | 6/1998 | Nemirofsky | ................. | 725/23 |
| 6,971,109 B1 * | 11/2005 | Williams et al. | ............ | 719/318 |
| 7,076,152 B1 * | 7/2006 | Eguchi et al. | ................. | 386/83 |
| 7,088,952 B1 * | 8/2006 | Saito et al. | ................. | 455/3.06 |
| 7,212,729 B2 * | 5/2007 | Nakajima et al. | ............. | 386/83 |
| 2002/0097985 A1 * | 7/2002 | Kaizu et al. | .................... | 386/83 |
| 2002/0168177 A1 * | 11/2002 | Kajitani | ........................ | 386/83 |

(Continued)

FOREIGN PATENT DOCUMENTS

JP         402252154 A  * 10/1990

(Continued)

OTHER PUBLICATIONS

International Preliminary Report On Patentability issued in corresponding PCT/JP2004/015587 file Oct. 21, 2004.

(Continued)

*Primary Examiner*—Peter-Anthony Pappas
*Assistant Examiner*—Gelek Topgyal
(74) *Attorney, Agent, or Firm*—Morrison & Foerster LLP

(57) ABSTRACT

A user photographs an area including a desired portion of a television program schedule (with G-code numbers) in a newspaper, and the like, with a digital camera functional portion (219) of a mobile telephone device (2). A CPU (209) performs, for example, a data transmission/reception by a mobile telephone functional portion (231) (a communication process, an Internet connection process, electronic mail transmission and reception processes), and control of each of functional portions based on received data. Moreover, the CPU (209) performs a character recognition process on an image photographed with the digital camera functional portion (219) and on an image received by electronic mail by the mobile telephone functional portion (231), and executes a video recording reservation process based on the G-code number obtained by the recognition process.

8 Claims, 4 Drawing Sheets

U.S. PATENT DOCUMENTS

| | | | |
|---|---|---|---|
| 2003/0086694 A1* | 5/2003 | Davidsson | 386/83 |
| 2004/0052504 A1* | 3/2004 | Yamada et al. | 386/68 |
| 2004/0105532 A1* | 6/2004 | Nakano | 379/88.22 |
| 2007/0196078 A1* | 8/2007 | Kunii et al. | 386/83 |

FOREIGN PATENT DOCUMENTS

| | | |
|---|---|---|
| JP | 403083243 A * | 4/1991 |
| JP | 8-307729 | 11/1996 |
| JP | 08-307729 | 11/1996 |
| JP | 9-186810 | 7/1997 |
| JP | 2000-32111 | 1/2000 |
| JP | 2001-36669 | 2/2001 |
| JP | 2001-359004 | 12/2001 |
| JP | 2002-77839 | 3/2002 |
| JP | 2002-261959 | 9/2002 |
| JP | 2003-101625 | 4/2003 |
| JP | 2003-115139 | 4/2003 |

OTHER PUBLICATIONS

International Search Report of PCT/JP2004/015587, date of mailing Mar. 8, 2005.

* cited by examiner

FIG. 3

| 915 | 8.54 NEWS & WEATHER FORECAST 68335 |
|---|---|
| ×× △ ○○ | ○○ DRAMA ○△□ ~FINAL EPISODE~ <br> PERFORMER ×××× <br> ○○○○ □□□□ <br> △△△△ <br> 1809083 |
| | 10.09 VARIETY 97667538 |

G-CODE

MOBILE TELEPHONE DEVICE

TECHNICAL FIELD

The present invention relates to a mobile telephone device equipped with a broadcast receiving function and a received broadcast recording and reproducing function, in addition to a digital camera function and an image mail receiving function.

BACKGROUND ART

When timer video recording is performed, information required for the timer video recording, such as date and time, channel, start time, end time, and the like are input to a video recording apparatus. In addition, it is possible to make a video recording reservation by selecting a desired program from an electronic program guide. Moreover, it is possible to easily perform timer video recording by inputting to the video recording apparatus G-code (registered trademark) shown on a television program schedule in a newspaper (See Japanese Patent Laying-open No. 2001-359004). That is, the recording apparatus decodes the inputted G-code to obtain information on date, channel, program start time, and program time length, and executes video recording based on the information.

DISCLOSURE OF THE INVENTION

Problems to be Solved by the Invention

Incidentally, in recent years, there has been provided a mobile telephone equipped with a receiving function, and a recording and reproducing function for terrestrial digital broadcast, capable of reproducing recorded contents. Furthermore, there are many mobile telephones equipped with a digital camera function. Assume that a user found an interesting television program introductory comment in a part of a television program schedule in a newspaper, for example. If the user wants to perform timer video recording for the program, it would be possible to make a video recording reservation by inputting the G-code number of the program from numeric keys to the mobile telephone. However, if the user wants to show other person the part of the television program schedule, the user would be required to photograph the part using the digital camera function, and then, to input the G-code number of the program. In addition, when the person who has received the image of the part of the television program schedule by electronic mail on a mobile telephone also wants to perform timer video recording for the program, the person must memorize the G-code number on the received image, and then manually input the G-code number from the numeric keys. However, this causes a dissatisfaction that the person has to memorize the G-code number up to eight digits.

In view of the above circumstances, an object of the present invention is to provide a mobile telephone device capable of making a video recording reservation for a program by a timer video recording code without requiring a key input of the timer video recording code.

Means to Solve the Problems

In order to solve the above problem, a mobile telephone device according to the present invention is a mobile telephone device equipped with a broadcast receiving function, a received broadcast recording and reproducing function, and a digital camera function, which comprises a means for performing character recognition on an image photographed with a digital camera, a means for determining whether or not a character-recognized numerical sequence is a timer video recording code, and a means for receiving and recording broadcast based on a timer video recording code obtained by the character recognition.

Furthermore, a mobile telephone device according to the present invention is a mobile telephone device equipped with a broadcast receiving function, a received broadcast recording and reproducing function, and an image mail receiving function, which comprises a means for performing character recognition on an image received by electronic mail, a means for determining whether or not a character-recognized numerical sequence is a timer video recording code, and a means for receiving and recording broadcast based on a timer video recording code obtained by the character recognition.

With these configurations, a timer video recording code is recognized on the images, which allows a video recording reservation for a program to be performed without a key input of the timer video recording code.

A mobile telephone device may be configured such that a video recording reservation is allowed to be confirmed by a user by displaying information required for the video recording reservation, the information being obtained by decoding the timer video recording code obtained by the character recognition. In addition, a mobile telephone device may be configured such that, upon determining presence of a plurality of timer video recording codes, the video recording reservation is allowed to be confirmed by a user by sequentially displaying information required for the video recording reservation based on each timer video recording code.

EFFECTS OF THE INVENTION

As described above, according to the present invention, there is an advantage that a video recording reservation for a program can be performed by recognizing a timer video recording code without a key input of the timer video recording code.

BRIEF DESCRIPTION OF THE DRAWINGS

FIG. 3 is a descriptive diagram showing a photographed image of a television program schedule.

DESCRIPTION THE NUMERALS 2 mobile telephone device
202 liquid crystal display panel
204 MPEG4 video decoder
209 CPU
219 digital camera functional portion
3 memory card

MODE FOR CARRYING OUT THE INVENTION

Below, an embodiment of the present invention will be described with reference to FIGS. 1 to 4.

Figure 1:
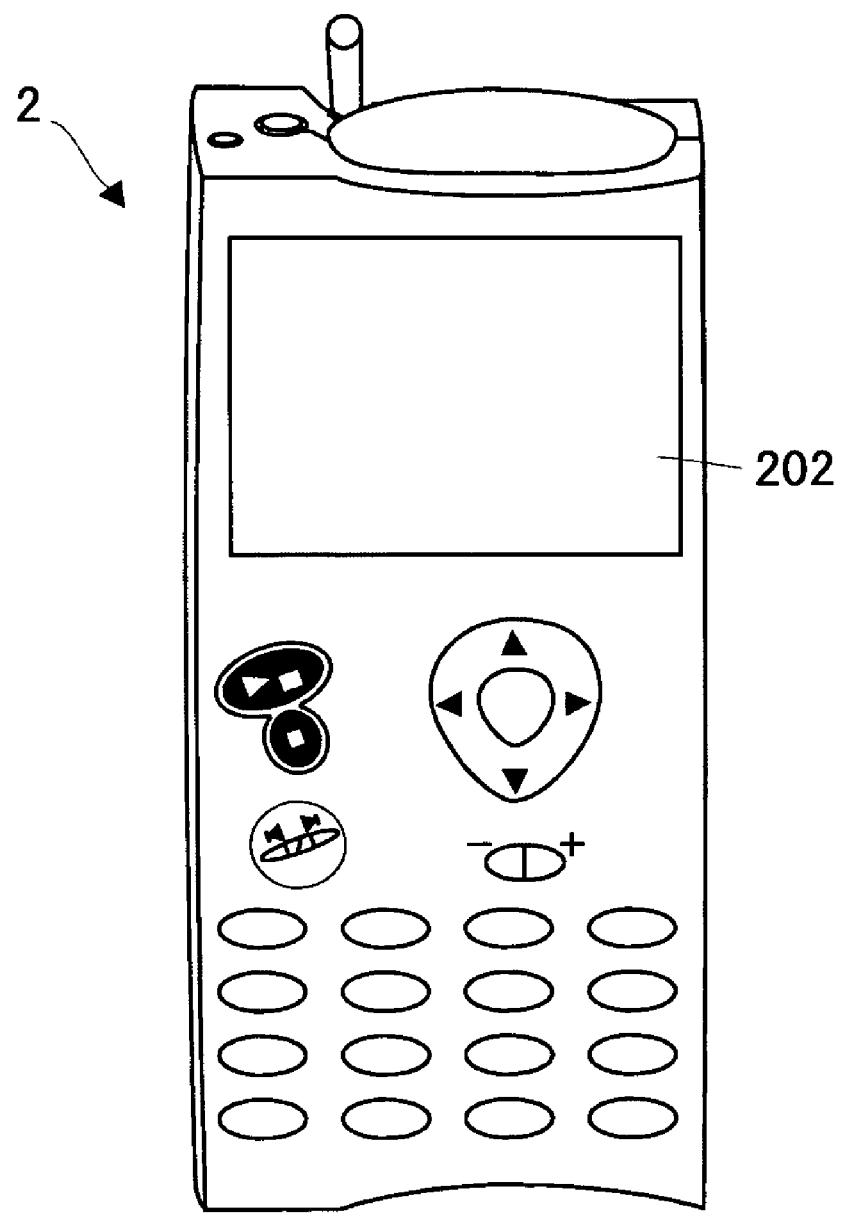
FIG. 1 is a perspective diagram showing an appearance of a mobile telephone device of an embodiment of the present invention.

FIG. 1 is a perspective diagram showing an appearance of a mobile telephone device 2 of this embodiment. Though this mobile telephone device 2 is equipped with a digital camera function, a lens portion is provided on the rear surface side of the device, so that the portion is located in a position out of sight in FIG. 1.

Figure 2:
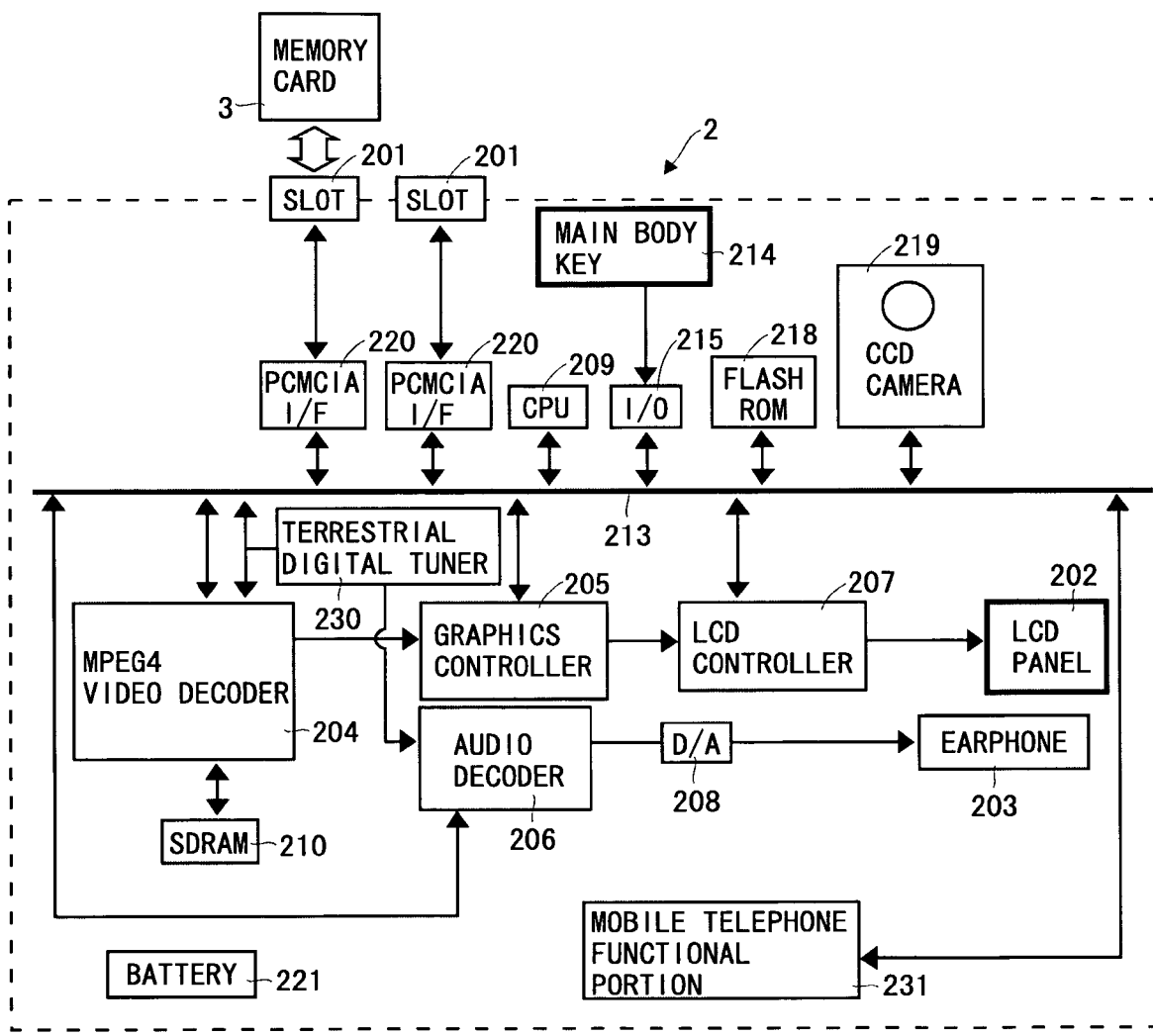
FIG. 2 is a block diagram showing a mobile telephone device of an embodiment of the present invention.

FIG. 2 is a block diagram of the mobile telephone device 2. The mobile telephone device 2 displays a video on a liquid crystal display panel 202 and outputs audio from an earphone 203, based on encoded video/audio data obtained by receiving broadcast with a terrestrial digital tuner 230, or encoded video/audio data read out from a memory card 3, for example, inserted in a slot 201. In addition, it is assumed that the encoded video data is MPEG4 data and the encoded audio data is MPEG2-AAC in this embodiment.

The MPEG4 data read out from the memory card 3 is fed to an MPEG4 video decoder 204 via a PCMCIA interface 220 and a system bus 213. Moreover, a tuner 230 for receiving terrestrial digital broadcast extracts bit stream data of MPEG4 broadcasted on the terrestrial digital broadcast and applied the data to the MPEG4 video decoder 204 and an audio decoder (MPEG2-AAC) 206.

The MPEG4 video decoder 204 decodes the bit stream data of MPEG4 so as to find a quantization coefficient and a motion vector, and feeds to a graphics controller 205 the video data obtained by carrying out an inverse DCT (Discrete Cosine Transformation) and a motion compensation control based on the motion vector, and the like. The graphics controller 205 performs processes such as color adjustment, and the like, on the video data (R, C, B data, for example). Moreover, the graphics controller 205 also performs a process for displaying, on the liquid crystal display panel 202, characters and the like (operation buttons, menu, an electronic program guide, etc.) which are instructed from the CPU 209 to output. The audio decoder 206 decodes the encoded audio data in the bit stream to generate audio data. An SDRAM 210 is utilized for the above-described process by the MPEG4 video decoder 204.

An LCD controller 207 drives the liquid crystal display panel 202 based on the video data fed from the graphics controller 205. Moreover, a D/A (digital to analog) converter 208 receives the audio data output from the audio decoder 206, performs a D/A conversion on the audio data, and generates analog signals for right (R) sound and left (L) sound to apply the signals to the earphone 203.

Main body keys 214 include operation buttons (recording, reproducing, posing, stopping, and forwarding) related to viewing, numeral keys, and the like. Information on an operation performed on the main body keys 214 is applied to the CPU 209 via an interface 215 and a system bus 213. The CPU 209 performs a necessary process based on the above information on the operation.

The CPU 209 also performs, for example, data transmission/reception by the mobile telephone functional portion 231 (a communication process, an Internet connection process, electronic mail transmission and reception processes, etc.), control of each of functional portions based on the received data, and reading/writing control of a FlashROM 218. Furthermore, the CPU 209 performs a character recognition process (optical character recognition process) on an image photographed with a digital camera functional portion 219 and on an image received by electronic mail by the mobile telephone functional portion 231, and a video recording reservation process based on the G-code number obtained by the recognition process.

Figure 4:
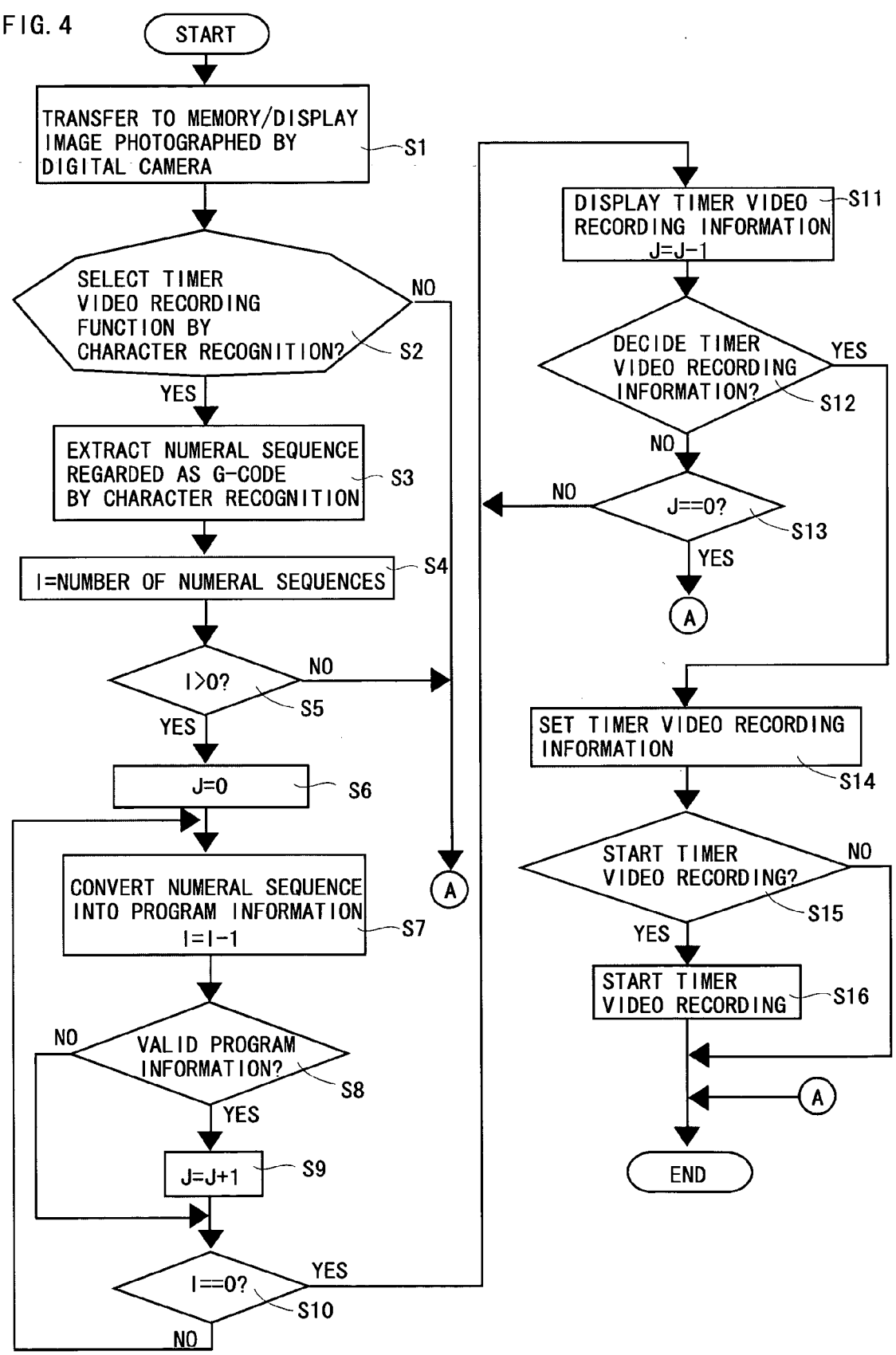
FIG. 4 is a flowchart showing a process content.

Next, the video recording reservation process by the CPU 209 will be described with reference to a flowchart of FIG. 4. It should be noted that, as shown in FIG. 3, a user photographs an area including a desired part of a television program schedule (with G-code numbers) in a newspaper, etc., by the digital camera functional portion 219 of the mobile telephone device 2. The CPU 209 transfers the photographed image to a memory and displays the image on the LCD panel (step S1). Next, the CPU 209 determines whether or not a timer video recording function by character recognition is selected by the user (step S2). This determination may be performed based on whether or not a predetermined key included in the main body keys 214 is operated, for example. It should be noted that an input frame for inputting a G-code number from the numerical keys may be displayed on a screen when the predetermined key is operated in a state where the photographed image is not displayed.

When the timer video recording function by character recognition is selected by the user (YES at the step S2), the CPU 209 extracts a numerical sequence regarded as G-code by performing the character recognition process on the image transferred to the memory (step S3). Moreover, the number of recognized numerical sequences is stored as I (step S4). Next, it is determined whether or not I is larger than zero (I>0) (step S5). When I is not larger than zero (not I>0), the video recording reservation process is terminated. On the other hand, when I is larger than zero (I>0), J indicating the number of pieces of valid program information is reset (step S6).

Next, the CPU 209 decodes the recognized numerical sequence to convert the numerical sequence into the program information, and subtracts 1 (one) from I (step S7). Then, the CPU determines whether or not the program information obtained by the conversion at the step S7 is valid (step S8), and adds 1 (one) to J when the information is valid (step S9). After that, the CPU determines whether or not I is 0 (zero) (step S10). If I is determined not to be 0 (zero), the process returns to the step S7 so as to check the next numerical sequence. On the other hand, if I is determined to be 0 (zero), the timer video recording information based on the program information determined to be valid at the step S8 is displayed for a confirmation by the user, and 1 (one) is subtracted from J (step S11). When there is no decision operation for the timer video recording information by the user (NO at step S12), the CPU determines whether or not J is 0 (zero) (step S13). When J is 0 (zero), the process is terminated. When J is not 0 (zero), the process returns to the step S11 so as to display the timer video recording information based on the next valid program information. On the other hand, there is the decision operation by the user at the step S12, the timer video recording information is set (step S14). Then, when timer video recording start time arrives (YES at the step S15), the timer video recording starts (step S16).

Though the character recognition process is performed on the image photographed with the digital camera functional portion 219 in the above-described video recording reservation process, the image received by electronic mail is displayed and the character recognition process may be performed on the image. Then, a video recording reservation can be performed by executing the process after the step S2 in the above-described flowchart.

In addition, G-code is shown as the timer video recording code in the above example. However, this is not always the case.

What is claimed is:
1. A mobile telephone device equipped with a broadcast receiving function, a received broadcast recording and reproducing function, and a mail receiving function, comprising:
   a unit for performing character recognition on data received by electronic mail:
   a unit for automatically extracting a numerical sequence out of character-recognized characters, decoding the extracted numerical sequence, and determining whether or not the numerical sequence is a valid timer video recording code; and a unit for receiving and recording broadcast based on a timer video recording code indicating information required for a video recording reservation for one program obtained by the character recognition, wherein a video recording reservation is allowed to be confirmed by a user by displaying information required for the video recording reservation, the information being obtained by decoding the timer video recording code obtained by the character recognition, wherein, upon determining presence of a plurality of timer video recording codes, obtained by the character recognition and indicating information required for a plurality of video recording reservations, respectively, the video recording reservation is allowed to be confirmed by a user by sequentially displaying information required for the video recording reservation based on each timer video recording code.

2. A mobile telephone device according to claim 1, wherein the information required for the video recording reservation includes at least date information and channel information.

3. A method for controlling a mobile telephone device equipped with a broadcast receiving function, a received broadcast recording and reproducing function, and a mail receiving function, comprising:

performing character recognition on data received by electronic mail;

automatically extracting a numerical sequence out of character-recognized characters, decoding the extracted numerical sequence, and determining whether or not the numerical sequence is a valid timer video recording code; and receiving and recording broadcast based on a timer video recording code indicating information required for a video recording reservation for one program obtained by the character recognition, wherein a video recording reservation is allowed to be confirmed by a user by displaying information required for the video recording reservation, the information being obtained by decoding the timer video recording code obtained by the character recognition, wherein, upon determining presence of a plurality of timer video recording codes, obtained by the character recognition and indicating information required for a plurality of video recording reservations, respectively, the video recording reservation is allowed to be confirmed by a user by sequentially displaying information required for the video recording reservation based on each timer video recording code.

4. A method for controlling a mobile telephone device according to claim 3, wherein the information required for the video recording reservation includes at least date information and channel information.

5. An electric communication device equipped with a broadcast receiving function, a received broadcast recording and reproducing function, and a mail receiving function, comprising:

a unit for performing character recognition on data received by electronic mail;

a unit for automatically extracting a numerical sequence out of character-recognized characters, decoding the extracted numerical sequence, and determining whether or not the numerical sequence is a valid timer video recording code; and a unit for receiving and recording broadcast based on a timer video recording code indicating information required for a video recording reservation for one program obtained by the character recognition, wherein a video recording reservation is allowed to be confirmed by a user by displaying information required for the video recording reservation, the information being obtained by decoding the timer video recording code obtained by the character recognition, wherein, upon determining presence of a plurality of timer video recording codes, obtained by the character recognition and indicating information required for a plurality of video recording reservations, respectively, the video recording reservation is allowed to be confirmed by a user by sequentially displaying information required for the video recording reservation based on each timer video recording code.

6. An electric communication device according to claim 5, wherein the information required for the video recording reservation includes at least date information and channel information.

7. A method for controlling an electric communication device equipped with a broadcast receiving function, a received broadcast recording and reproducing function, and a mail receiving function, comprising:

performing character recognition on data received by electronic mail;

automatically extracting a numerical sequence out of character-recognized characters, decoding the extracted numerical sequence, and determining whether or not the numerical sequence is a valid timer video recording code; and receiving and recording broadcast based on a timer video recording code indicating information required for a video recording reservation for one program obtained by the character recognition, wherein a video recording reservation is allowed to be confirmed by a user by displaying information required for the video recording reservation, the information being obtained by decoding the timer video recording code obtained by the character recognition, wherein, upon determining presence of a plurality of timer video recording codes, obtained by the character recognition and indicating information required for a plurality of video recording reservations, respectively, the video recording reservation is allowed to be confirmed by a user by sequentially displaying information required for the video recording reservation based on each timer video recording code.

8. A method for controlling an electric communication device according to claim 7, wherein the information required for the video recording reservation includes at least date information and channel information.

* * * * *